Patented Nov. 27, 1951

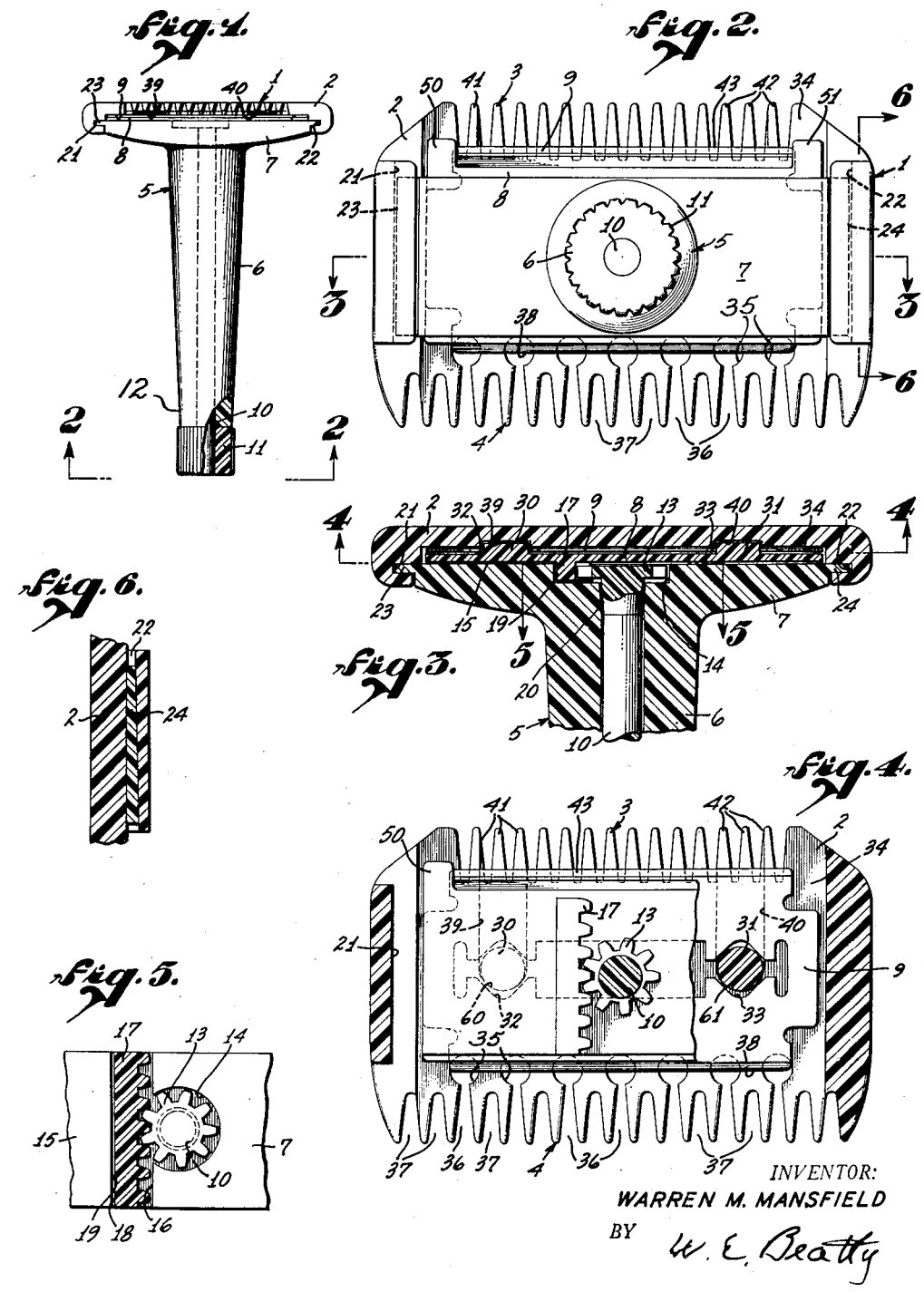

2,576,618

UNITED STATES PATENT OFFICE 2,576,618

HANDLE TYPE HAIR TRIMMER

Warren M. Mansfield, Glendale, Calif., assignor, by mesne assignments, to Cutter Corporation, a corporation of Delaware Application March 12, 1948, Serial No. 14,612

6 Claims. (Cl. 30—31)

The invention relates to a handle type hair trimmer having an adjustable razor blade. The device is adapted to serve several purposes such as trimming various lengths of hair, thinning the hair, shaving, and combing without cutting.

An object of the invention is to provide a hair trimmer having a handle to facilitate using the device. The handle is preferably made integral with a cover plate for the blade, the unitary cover plate and handle preferably being removable from the comb for compactness in packaging the device.

A further object of the invention is to provide a hair trimmer having an adjustable blade holder, to vary the cutting relation of the blade with the teeth, wherein the operating mechanism for adjusting the blade holder is mounted in the unitary cover plate and handle, the blade holder being provided with a cooperating mechanism which is separable so that the blade holder can be removed.

For further details of the invention reference may be made to the drawings wherein Fig. 1 is a plan view of a handle type hair trimmer according to the present invention.

Fig. 2 is an enlarged end view looking in the direction of the arrows on line 2—2 of Fig. 1.

Fig. 3 is a sectional view on line 3—3 of Fig. 2.

Fig. 4 is a sectional view on line 4—4 of Fig. 3.

Fig. 5 is a partial sectional view on line 5—5 of Fig. 3.

Fig. 6 is a partial sectional view on line 6—6 of Fig. 2.

Fig. 1 shows full size and the remaining figures show double full size a certain model from which the drawings were prepared although other dimensions may be employed.

Referring in detail to the drawings, the trimmer 1 may be molded plastic material and it comprises a body member 2 having opposed sets of teeth 3 and 4, a unitary handle and cover plate 5 having a handle 6 and a cover plate 7, and a slide or blade holder 8, for a double edge razor blade 9.

Mounted in the handle 6, which projects transversely from the cover plate 7, is an operating shaft 10 having cemented thereon a plastic knob 11 at the lower end 12 of the handle 6. The other end of shaft 10 has a pinion 13 arranged in a recess 14 so that the outer end of the pinion will be either flush with or slightly below the rectangular face 15 of the cover plate 7. Adjoining the recess 14 is a rack recess 16 for the rack 17 cast integral with the front of blade holder 8. Rack 17 operating in recess 16 serves to guide the blade holder 8 for movement lengthwise of the teeth 3, 4, the back of the rack 17 for this purpose having a straight shoulder 18 which slidably fits the straight shoulder 19 at the side of recess 16.

To frictionally hold the blade 9 and holder 8 in adjusted position, preferably the inner end of shaft 10 has a taper fit in the handle as indicated at 20, the knob 11 being cemented on shaft 10 to wedge the taper fit 20 with some friction.

The body 2 terminates at its opposite ends in channels 21, 22 in which slidably fit the reduced ends 23, 24 respectively on the cover plate 7.

Preferably the channels 21, 22 are tapered, decreasing in height in a direction from teeth 4 to teeth 3, and the reduced ends 23, 24 have a corresponding taper so that the cover plate will be thereby wedged in position when the cover plate is in position as shown in Fig. 2, centrally disposed with respect to the two sets of teeth 3 and 4. The cover plate 7 and its handle 6 can be removed from the tooth body 2 sliding it downwardly as seen in Fig. 2, across the teeth 4. The purpose of this is to make the device more compact for packaging it and such removal is not necessary to replace a new blade, as the blade holder is removable while the cover plate 7 remains in position on the body 2. The blade holder 8 is removable in the opposite direction across the teeth 3. The blade holder 8 has a suitable lug or lugs, here shown as two lugs 30, 31 which fit corresponding apertures 32, 33 respectively in the blade, which fits flat against the flat side 34 of the body 2. The flat side 34 is flush with the full length of teeth 3 and flush with the full length of the teeth 4. Alternate ones of the teeth have long slots 36. The remaining teeth in the set 4 have short slots 37 which are beyond reach of the cutting edge 38 of the blade as the ends 60, 61 of the recesses 39, 40 respectively serve as stops for lugs 30, 31 to limit movement of the blade 9 so that cutting edge 38 in its limiting position outwardly of teeth 4 will cover one half of the circular openings like 35 at the base of the long slots 36 but will not intersect the short slots 37. The base of the long lots 36 and the base of the teeth 3 are more closely spaced than the width of the blade 9 and cover plate 7 is slightly narrower than the width of blade 9.

The lugs 30 and 31 on the blade holder do not serve to guide the blade holder and the blade lengthwise of the teeth, as their corresponding recesses shown in dotted lines at 39 and 40 in Fig. 4, in the side 34 of the body 2 are wider than their lugs to provide clearance. The recesses 39 and 40 are extended through certain of the teeth in the set 3 as indicated at 41 and 42 so as to permit removal and insertion of the blade holder 8.

With the blade in position shown in Fig. 4, the teeth 4 and the lower blade edge 38 may be employed to thin the hair as whatever hair is caught in the alternate short slots 37 is not cut whereas the hair reaching the long slots 36 is cut. By turning the trimmer around, its other side may be used for trimming. The shorter the hair to be cut, the closer the cutting edge should be to the tips of the teeth, as teeth 3 are thinner at the tip than at the base and teeth 3 usually lie practically flat on the scalp for the trimming operation. By turning the knob 11 the blade 9 may be removed from the base of the long slots 36 whereby the teeth 4 may be used as an ordinary comb, while the teeth 3 and the blade edge 43 then being at an intermediate position thereon may be used to make a shorter cut. Also by turning knob 11, the cutting edge 43 may be adjusted slightly beyond the tips of the teeth 3 for use as a razor. By turning the knob 11 still more, rack 17 will be released from pinion 13 whereby the blade may be removed and replaced with a new one.

The holder 8 has two lugs 50, 51 at its opposite ends for engagement by the fingers to urge the holder inwardly when replacing it, to engage rack 17 with pinion 13. Lugs 50 and 51 overlie the ends of the cutting edge 43.

It will be apparent that the channels 21 and 22 support the cover plate 7 with its face 15 parallel to and spaced from the adjacent side 34 of the body, thereby providing a recess in which the holder 8 and its blade 9 slidably fit edgewise.

It will be apparent that various modifications may be made in the invention without departing from the spirit of the following claims.

I claim:

1. A comb having teeth, said comb having a substantially flat side flush with one side of said teeth, a handle having a cover plate thereon, means supporting said cover plate spaced from and parallel to said side, a razor blade holder slidably fitting edgewise between said side and said cover plate, lug means on one side of said blade holder for the blade, means guiding said holder for sliding movement between said side and said cover plate lengthwise of said teeth, and means at the other side of said blade holder for sliding said blade holder, said supporting means for said cover plate comprising parallel channels at opposite ends of said comb, said cover plate having ends slidably fitting said channels respectively, said ends and said channels being wedge shaped and frictionally holding said cover plate in position.

2. A hair cutting comb comprising a body portion having teeth at one side thereof, a blade holder therefor, lug means on one side of said blade holder for the blade, a guide for said blade holder, a rotatable shaft having an axis transverse to said body portion, a unitary handle and cover plate, said handle extending transversely from said cover plate, said handle and said cover plate supporting said shaft spaced from and transverse to said body portion, said shaft having an inner end having one member of a motion transmitting mechanism and a cooperating separable member of said mechanism on said holder for adjusting said holder to adjust the cutting edge of the blade along said teeth and for removing said holder, said members of said motion transmitting mechanism being positioned at the other side of said blade holder, said guide guiding said blade holder for sliding movement between the inner end of said shaft and said body portion.

3. A hair cutting comb having opposite sets of teeth, a handle having a cover plate, means supporting said cover plate in spaced relation to the side of said comb, said side and said cover plate providing a compartment opening into both of said sets of teeth, a blade holder for a double edge blade slidable in said compartment, a shaft in said handle, and a manually operable motion transmitting mechanism between said shaft and said holder and located between said blade holder and said cover plate for shifting said holder along both of said sets of teeth to shift the double edge blade inwardly of one set of teeth and outwardly of the other set.

4. A hair trimmer comprising a comb having opposite sets of teeth, said sets having parallel base lines more closely spaced than the width of a double edge razor blade, a handle having a cover plate, guideways at opposite ends of said comb for said cover plate, the side of said comb and said cover plate forming a razor blade recess greater in width than the width of said blade, said recess extending over said opposite sets, a blade holder slidable in said recess, a rotatable shaft in said handle, said shaft extending transversely of said comb, a pinion on the inner end of said shaft, said cover plate having a recess for said pinion and having a rack recess extending parallel to the teeth of both of said sets, a cooperating rack on the front of said blade holder, said rack slidably fitting in said rack recess and guiding said blade holder, the rear of said blade holder having lug means to receive the blade, said side of said comb having a recess means for said last mentioned lug means, said recess means extending lengthwise of said teeth.

5. A hair trimmer comprising a comb having opposite sets of teeth, said sets having parallel base lines more closely spaced than the width of a double edge razor blade, a handle having a cover plate thereon forming with the side of said comb a razor blade recess greater in width than the width of said blade, said recess extending over said opposite sets, a double edge razor blade holder slidable in said recess, means guiding said blade holder so the blade will overlie a decreasing length of the teeth of one set and an increasing length of the teeth of the other set, an operating shaft extending through said handle and a driving connection at the front of said blade holder and behind said cover plate between said shaft and said blade holder.

6. Cutlery comprising a body having opposed sets of teeth, a cover plate having a handle integral therewith, means removably supporting said body on said cover plate with said cover plate spaced from the side of said body between said sets of teeth to form a recess, a blade holder slidable in said recess, said holder having lugs for removably supporting a double edge razor blade between said cover plate and said side of said body, and rack and pinion means at the front of said holder for operating said holder.

WARREN M. MANSFIELD.

REFERENCES CITED

The following references are of record in the file of this patent:

UNITED STATES PATENTS

| Number | Name | Date |
|---|---|---|
| 811,999 | Benet | Feb. 6, 1906 |
| 1,257,079 | Hartman | Feb. 19, 1918 |
| 1,789,234 | Keenan | Jan. 13, 1931 |
| 1,821,825 | Zumwalt | Sept. 1, 1931 |
| 1,831,017 | Lind | Nov. 10, 1931 |
| 1,951,775 | Seilaz | Mar. 20, 1934 |
| 2,281,166 | Nava | Apr. 28, 1942 |
| 2,321,825 | Ardner | June 8, 1943 |

FOREIGN PATENTS

| Number | Country | Date |
|---|---|---|
| 589,585 | Germany | Dec. 11, 1933 |